(12) United States Patent
Uemura (10) Patent No.: US 9,267,790 B2
(45) Date of Patent: Feb. 23, 2016

(54) MEASURING DEVICE OF MEASUREMENT OBJECT, CALCULATING DEVICE, MEASUREMENT METHOD, AND METHOD FOR PRODUCING ITEM

(71) Applicant: CANON KABUSHIKI KAISHA, Tokyo (JP)

(72) Inventor: Takanori Uemura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 14/295,061

(22) Filed: Jun. 3, 2014

(65) Prior Publication Data
US 2014/0362385 A1    Dec. 11, 2014

(30) Foreign Application Priority Data

Jun. 6, 2013   (JP) ................................ 2013-120158
Jun. 6, 2013   (JP) ................................ 2013-120159

(51) Int. Cl.
*G01B 11/02*     (2006.01)
*G01B 11/24*     (2006.01)
*G01B 11/245*    (2006.01)
*G01B 11/25*     (2006.01)

(52) U.S. Cl.
CPC .......... *G01B 11/2441* (2013.01); *G01B 11/028* (2013.01); *G01B 11/245* (2013.01); *G01B 11/25* (2013.01)

(58) Field of Classification Search
CPC .............. G01B 11/24; G01B 11/2433; G01B 11/2441; G01B 9/02027; G01B 9/02029
USPC .................................. 356/489, 495, 511, 516
See application file for complete search history.

(56) References Cited

U.S. PATENT DOCUMENTS

| | | | |
|---|---|---|---|
| 6,291,816 B1 * | 9/2001 | Liu ...................... | G01B 11/002 250/234 |
| 2007/0271064 A1 | 11/2007 | Walton | |
| 2012/0044343 A1 | 2/2012 | Kurihara | |

FOREIGN PATENT DOCUMENTS

| | | |
|---|---|---|
| JP | 4400894 B2 | 1/2010 |
| JP | 2012-042324 A | 3/2012 |

* cited by examiner

*Primary Examiner* — Jonathan Hansen
(74) *Attorney, Agent, or Firm* — Canon USA, Inc. IP Division (57) ABSTRACT

A measuring device that measures a measurement object includes a two-dimensional measuring unit that outputs two-dimensional image data by performing image pickup on the measurement object, a three-dimensional measuring unit that outputs three-dimensional data by three-dimensionally measuring the measurement object; and an obtaining unit that detects a temporary edge of the measurement object using the three-dimensional data, sets an edge detection range in a two-dimensional image using the detected temporary edge, and detects an edge of the measurement object in the edge detection range using the two-dimensional image data to obtain shape information of the measurement object.

18 Claims, 8 Drawing Sheets

MEASURING DEVICE OF MEASUREMENT OBJECT, CALCULATING DEVICE, MEASUREMENT METHOD, AND METHOD FOR PRODUCING ITEM

BACKGROUND OF THE INVENTION

1. Field of the Invention

The present invention relates to a measuring device, a calculating device, a measurement method, and a method for producing an item, which calculate shape information, such as the dimensions, the tolerance, and the angle, of a measurement object by measuring the measurement object.

2. Description of the Related Art

An image measuring device is a device that measures the dimensions of a measurement object. The image measuring device performs image pickup on a measurement object to obtain an image of the measurement object. Then, the image measuring device detects edges (ends) of the measurement object from data regarding a change in the intensity of the image, and calculates the distance between the detected edges, to measure the dimensions of the measurement object. In the method for detecting the edges from the data regarding a change in the intensity of the image of the entire measurement object, surface texture (surface unevenness) or an inner side of a chamfered portion of the measurement object may be falsely detected as an edge. Therefore, when a range in which the edge detection is performed from the data regarding a change in the intensity of the image (edge detection range) is set within a narrow range of the vicinity of true edges, it is possible to reduce the possibility of a false detection. In an existing measuring device, in order to precisely detect the edges of the measurement object, it is necessary for an operator to determine portions that are thought to be the edges from the image and manually set the edge detection range.

Accordingly, in order to reduce such a troublesome task of the operator, a method in Japanese Patent Laid-Open No. 2012-42324 is proposed. This document proposes a measuring device that binarizes a two-dimensional image of the entire measurement object to extract contour lines (temporary edges), and that automatically sets an edge detection range in the vicinity of the contour lines to more precisely detect the positions of the edges within the range. Japanese Patent No. 4400894 proposes a measuring device that three-dimensionally measures a measurement object and that extracts the edges of the measurement object from three-dimensional point group data of the measurement object.

As mentioned above, in the method for detecting edges from data regarding a change in the intensity of the entire image, portions other than the edges may be falsely detected as the edges. Therefore, in the method discussed in Japanese Patent Laid-Open No. 2012-42324, even if a two-dimensional image of the entire measurement object is binarized when the measurement object has surface texture, contour lines (temporary edges) may be falsely detected where the surface texture is provided. As a result, an edge detection range cannot be properly set afterwards.

In the method discussed in Japanese Patent No. 4400894, since three-dimensional data is used, the influence of surface texture on edge detection is small. However, measurement time and the quantity of three-dimensional point group data are in a trade-off relationship, so that it is practically difficult to obtain three-dimensional point group data having a high resolution (high density). This is because, even if three-dimensional point group data having a high resolution is obtained, it takes a long time to process a large quantity of three-dimensional point group data. In contrast, when three-dimensional point group data having a low resolution is obtained, the precision is reduced. Thus, the positions of the edges cannot be detected with high precision.

SUMMARY OF THE INVENTION

The present invention makes it possible to detect an edge of a measurement object with high precision.

To this end, according to an aspect of the present invention, there is provided a measuring device that measures a measurement object. The measuring device includes a two-dimensional measuring unit that outputs two-dimensional image data by performing image pickup on the measurement object, a three-dimensional measuring unit that outputs three-dimensional data by three-dimensionally measuring the measurement object; and an obtaining unit that detects a temporary edge of the measurement object using the three-dimensional data, sets an edge detection range in a two-dimensional image using the detected temporary edge, and detects an edge of the measurement object in the edge detection range using the two-dimensional image data to obtain shape information of the measurement object.

Further features of the present invention will become apparent from the following description of exemplary embodiments with reference to the attached drawings.

DESCRIPTION OF THE EMBODIMENTS

Exemplary embodiments of the present invention are hereunder described in detail with reference to the attached drawings.

First Exemplary Embodiment

Figure 1:
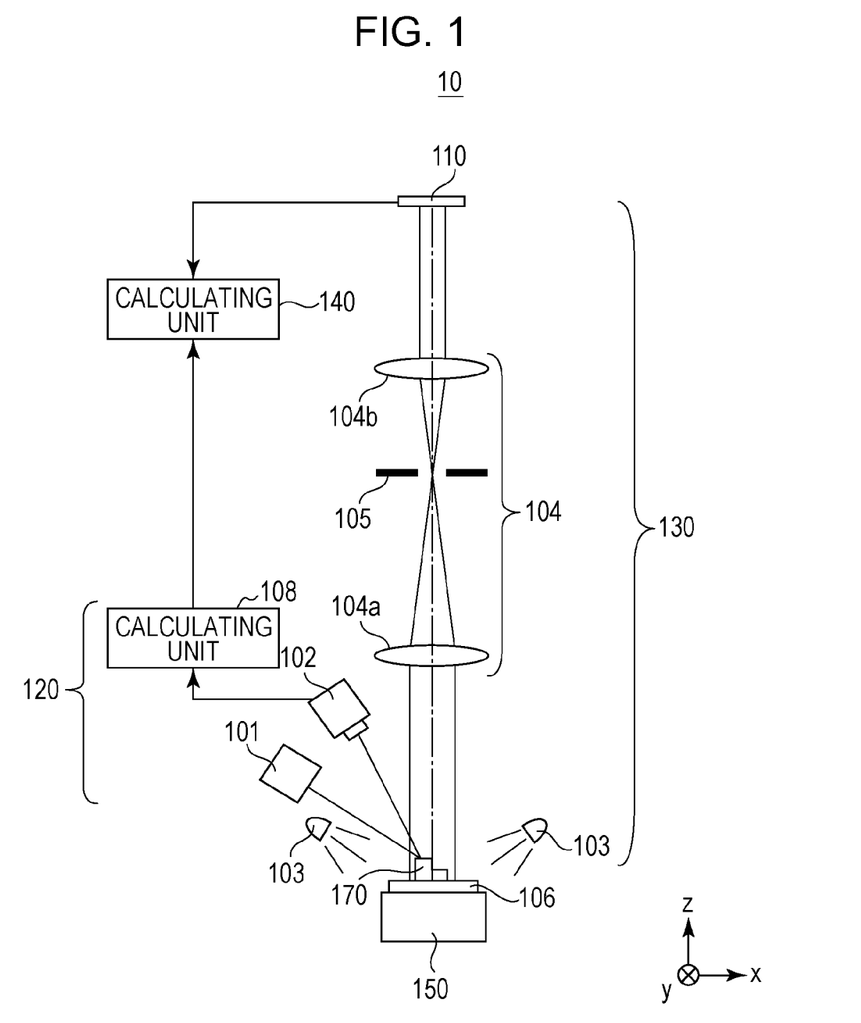
FIG. 1 is a schematic view of a measuring device according to a first exemplary embodiment.

FIG. 1 is a schematic view of a measuring device 10 that measures a measurement object 170 according to a first exemplary embodiment. The measuring device 10 includes a three-dimensional measuring unit 120 that three-dimensionally measures the measurement object 170 and that outputs three-dimensional data including height (z) data and vertical-and-horizontal (x, y) two-dimensional data. The three-dimensional measuring unit 120 of the measuring device 10 is a measuring unit that makes use of the principles of an optical cutting method. The three-dimensional measuring unit 120 includes a line illumination unit 101 that linearly illuminates the measurement object 170, an image pickup unit (light detecting unit) 102, and a calculating unit (an obtaining unit) 108. The line illumination unit 101 linearly illuminates the measurement object 170. Then, the image pickup unit 102 measures distortion of an illumination line generated on the basis of the shape of the measurement object 170, and the calculating unit (the obtaining unit) 108 calculates (obtains) the three-dimensional shape of the measurement object 170 from measurement data.

The line illumination unit 101 is capable of scanning a linear illumination position using a galvanometer mirror (not shown). This makes it possible to successively illuminate the entire measurement object 170 and the vicinity thereof. A support 106 that supports the measurement object 170 is made rotatable by a rotary stage (not shown). The rotary stage causes the measurement object 170 to rotate relative to the line illumination unit 101 and the image pickup unit 102, to successively obtain images at the image pickup unit 102. This makes it possible to measure the measurement object 170 from all directions. Data of the images subjected to image pickup by the image pickup unit 102 is sent to the calculating unit 108. The calculating unit 108 includes a computing section that performs computation using the sent images. The computing section calculates the amount of distortion of a line from the obtained images, and, using known information regarding the arrangement of the line illumination unit 101 and the image pickup unit 102, calculates three-dimensional point group data of the measurement object 170. The three-dimensional point group data includes data regarding the height of the measurement object 170 (in the direction z in FIG. 1) and vertical-and-horizontal (directions x and y) two-dimensional data.

The measuring device 10 also includes a two-dimensional measuring unit 130 that two-dimensionally measures the measurement object 170 in the directions x and y and that outputs two-dimensional-image data (in the directions x and y). The two-dimensional measuring unit 130 includes incoherent light sources 103, an optical system 104, and an image pickup unit (image pickup element) 110.

The incoherent light sources 103 include a plurality of light-source elements. The plurality of light source elements are arranged in the form of a ring so as to surround the measurement object 107. Each light source element is controllable so as to turn on individually. This makes it possible to illuminate the measurement object 170 from a desired direction.

Light that has been emitted from the incoherent light sources 103 and has illuminated the measurement object 170 is reflected or scattered by the measurement object 170, and is converged by the optical system 104. A light receiving surface of the image pickup unit 110 and the measurement object 170 are in a conjugate relation due to the optical system 104. The image pickup unit 110 performs image pickup on the measurement object 70, and outputs two-dimensional image data of the measurement object 170. The two-dimensional image data is data in which light intensity distribution at a shooting surface of the image pickup unit 110 on which light from the measurement object 170 and its vicinity has been projected is numerically represented. The two-dimensional image data may be monochromatic data or color data. The optical system 104 includes a lens 104*a*, a lens 104*b*, and an iris diaphragm 105 disposed between the lens 104*a* and the lens 104*b*. Therefore, by changing the aperture diameter of the iris diaphragm 105, it is possible to adjust the resolving power of the optical system 104. Since the precision with which the dimensions in the lateral directions (directions x and y) are measured depend upon the resolution of the image pickup unit 110, it is desirable that the number of pixels of the image pickup unit 110 be large. The two-dimensional image data that has been output by the image pickup unit 110 is sent to a calculating unit 140.

The difference between the resolution of the three-dimensional point group data and the resolution of the two-dimensional image data is not limited. However, since when the resolution of the three-dimensional point group data is high, it takes longer to perform computation, it is desirable that the resolution of the three-dimensional point group data be as low as possible and that a two-dimensional image be used in detecting edges with higher precision. In the three-dimensional measurement, the measurement object may be measured with the resolution being set relatively high at a presupposed region of the vicinity of the edges, and with the resolution being set relatively low at a region that is distant from the edges. Here, the resolution (density) is represented by how many pixels or items of pixel data are arranged per unit length (such as one inch), and its units are, for example, pixels per inch (ppi).

Figure 2:
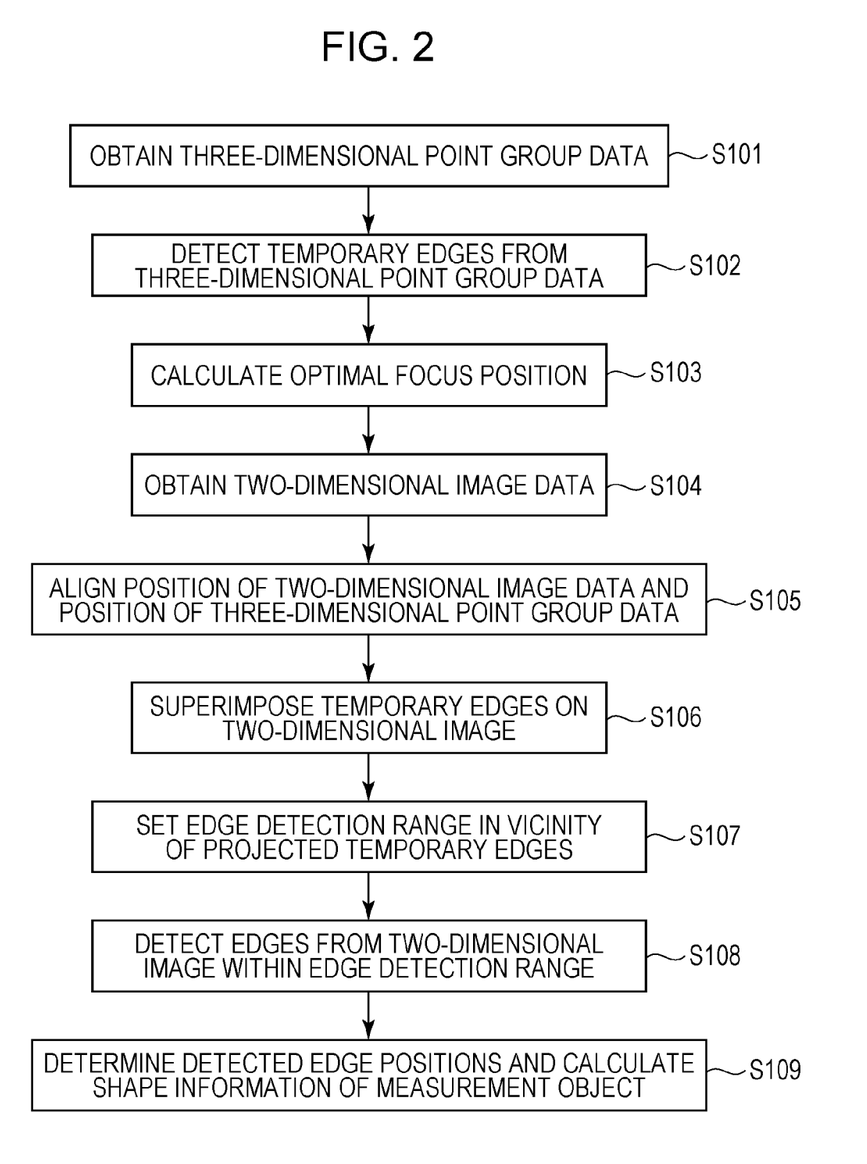
FIG. 2 is a flowchart of a process performed by a calculating unit.

The measuring device 10 includes the calculating unit (calculating device) 140 that automatically measures with high precision the positions of the edges of the measurement object 170 using the three-dimensional point group data and the two-dimensional image data, and that calculates shape information, such as the dimensions, the tolerance, and the angle, of the measurement object 170 from the measured edge positions. The calculation process is described with reference to FIG. 2 and FIGS. 3A to 3E. FIG. 2 is a flowchart of the calculation process performed by the calculating unit 140. The calculation process includes Step S101 to Step S109. FIGS. 3A to 3E show measurement data and an edge detection range and calculation data obtained by using the calculation process.

Figure 3A:
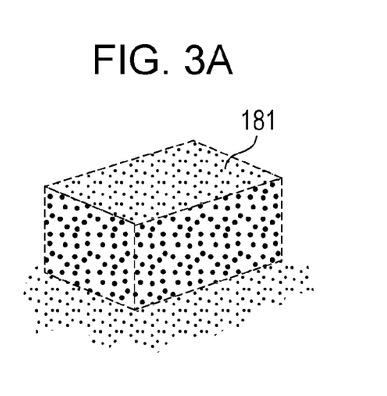
FIG. 3A shows three-dimensional point group data.

First, an obtaining section of the calculating unit 140 obtains three-dimensional point group data of the measurement object 170 that has been output from the three-dimensional measuring unit 120 (S101). FIG. 3A shows three-dimensional point group data 181 obtained by measuring the shape of a rectangular parallelepiped measurement object. An item of three-dimensional measurement data at each point of the measurement object is represented by a black dot. Dotted lines supplementarily represent edges of the measurement object from the viewpoint of easier viewing. The dotted-line data is not included in the three-dimensional point group data. The measuring device 10 according to the exemplary embodiment is formed so that three-dimensional point group data of the four side surfaces of the measurement object can also be obtained by rotating the measurement object 170 relative to the image pickup unit 102. If there is three-dimensional point group data of the side surfaces of the measurement object, it is possible to more precisely detect the edges in accordance with the increase in the quantity of data. However, three-dimensional point group data of the side surfaces of the measurement object is not necessarily required, so that the measuring device to which the present invention is applicable is not limited to such a condition.

Figure 3B:
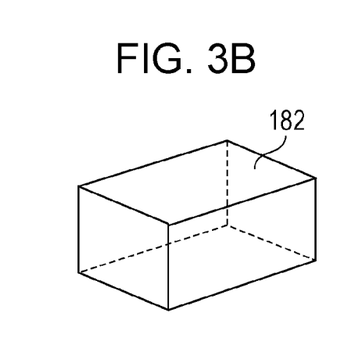
FIG. 3B shows temporary edges.

The calculating unit 140 detects temporary edges of the measurement object 170 using the three-dimensional point group data (S102). FIG. 3B shows temporary edges 182 (solid lines and dotted lines) detected from the three-dimensional point group data 181 shown in FIG. 3A. The method for detecting the temporary edges 182 from the three-dimensional dot group data 181 may use any algorithm. For example, a method for detecting edges on the basis of changes in a normal line and the depth (height) of the three-dimensional point group data, and a method for detecting edges on the basis of the distance and direction of a normal line or continuity of triangular polygons, which are generated from the three-dimensional point group data, that are adjacent to each other are known. Since these methods use depth (height) information of the measurement object, it is possible to identify surface texture. Therefore, these methods are not easily influenced by the surface texture, so that true edges can be detected with high precision. However, since, of the three-dimensional point group data 181, the density of data in the lateral directions (the directions x and y) that are orthogonal to an optical axis of the optical system 104 is less than the density of the two-dimensional image data, the precision with which the positions of the edges are detected is not high. Therefore, as described below, the positions of the edges are determined with high precision using the two-dimensional image data.

Next, the calculating unit 140 calculates an optimal focus position in performing measurement by the two-dimensional measuring unit from the three-dimensional point group data 181 (S103). Then, a controller (control unit) (not shown) adjusts the focus position by moving a Z-axis stage 150 in a direction Z. The Z-axis stage 150 supports the support 106, and moves. The focus position is determined so that the edges of the measurement object 170 are subjected to image pickup by the image pickup unit 110 so as to be sharpest. The calculating unit 140 calculates height information of each temporary edge from the three-dimensional point group data 181. Then, from the height information of each temporary edge, the calculating unit 140 calculates, for the temporary edges, the focus positions at which the corresponding temporary edges are focused. By moving the measurement object 170 to the optimal focus position by the Z-axis stage 150 and successively performing image pickup on the measurement object 170 by the image pickup unit 110, sharp images of the corresponding temporary edges can be obtained. Although the Z-axis stage 150 is used as a focus adjusting unit, the focus position can be adjusted by changing the focal position of the optical system 104. This step may be omitted when the depth of focus of the optical system 104 at a telecentric end is wide. When the aperture diameter of the iris diaphragm 105 is increased for increasing the resolving power of the optical system 104, the depth of focus is shallow. Therefore, it is desirable to perform focus adjustment.

Figure 3C:
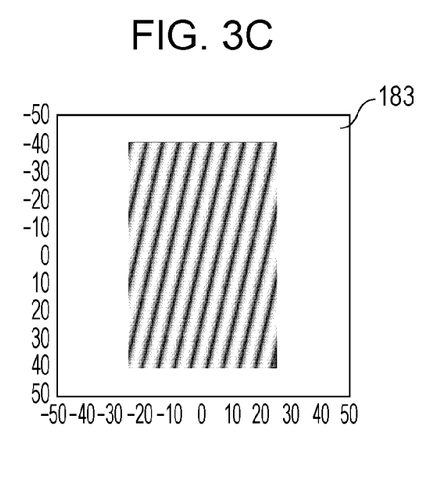
FIG. 3C shows a two-dimensional image.

Next, the obtaining section of the calculating unit 140 obtains two-dimensional image data of the measurement object 170 subjected to the image pickup by the image pickup unit 110 (S104). FIG. 3C shows a two-dimensional image 183 of the aforementioned rectangular parallelepiped measurement object. The intensity of light of the two-dimensional image 183 is represented by shades of color. Since the measurement object has a surface with a stripe-like texture, the stripes may be falsely detected as the edges in a simple method, such as binarization.

Next, the calculating unit 140 aligns the position of the two-dimensional image data and the position of the three-dimensional point group data so that actual same positions match (S105). For example, a previously known reference object is subjected to image pickup by both image pickup units to ascertain the correspondences between the orientations and magnifications of two images, and they are aligned on the basis of the correspondences. If the position of the three-dimensional point group data and the position of the two-dimensional image data are associated with each other by hardware (for example, if the image pickup units and the optical system are precisely aligned), it is possible to omit this step.

Next, in the state in which the position of the two-dimensional image data and the position of the three-dimensional point group data have been aligned, the temporary edges that have been detected in S102 are superimposed upon the two-dimensional image (S106). As described above, in order to detect the true edges with high precision from the two-dimensional image data by reducing the possibility of false detection of the edges, it is necessary to set an edge detection range (window region) in the two-dimensional image. Therefore, next, an edge detection range in the two-dimensional image is set.

Figure 3D:
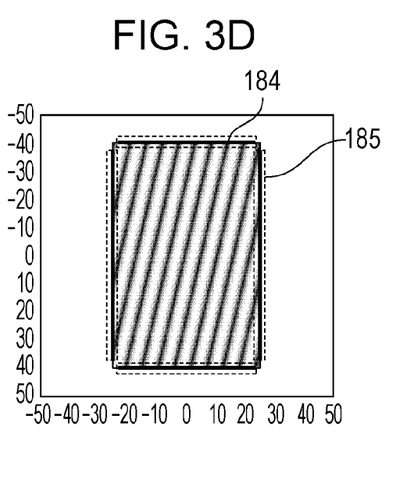
FIG. 3D shows temporary edges and an edge detection range.

The calculating unit 140 automatically sets the edge detection range so that the edge detection range is set in the vicinity of the temporary edges projected in the two-dimensional image data (S107). In this way, by setting the edge detection range in a narrow range that is limited to the vicinity of the temporary edges, the possibility of false detection of the edges is reduced, so that the positions of the edges are detected with high precision. FIG. 3D shows superimposed temporary edges 184 (black solid lines) and an edge detection range 185 (black dotted lines) that is set in the vicinity of the superimposed temporary edges 184 for the two-dimensional image 183 of the rectangular parallelepiped measurement object.

Figure 3E:
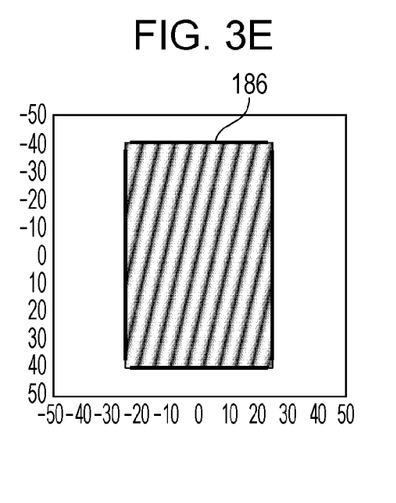
FIG. 3E shows detected edges.

Next, the calculating unit 140 detects the edges from the two-dimensional image in the set edge detection range 185 (S108). FIG. 3E shows detected edges 186 (black solid lines) in the two-dimensional image 183 of the rectangular parallelepiped measurement object. Since the edge detection range is limited, the possibility of falsely detecting edges due to the texture of the measurement object is lower than that when detecting edges in the entire two-dimensional measurement object. Therefore, the measuring device 10 is capable of measuring with higher precision the true positions of the edges of the measurement object to be measured. In addition, since the edge detection range is limited, computation time for detecting the edges is reduced.

When the measurement object has a chamfered portion, setting the edge detection range only for the chamfered portion makes it possible to detect an angular surface or a round surface of the chamfered portion at a more specific position. Therefore, it is possible to identify the true positions of the edges of the chamfered portion to be measured.

Next, using the two-dimensional image data, the calculating unit 140 calculates shape information, such as the dimensions, the geometrical tolerance, the angle, the orthogonality, and the circularity, of the measurement object 170 from the positions of the plurality of edges measured with high precision (S109). Since the shape information is obtained from the two-dimensional image data, the shape information relates to two-dimensional information. Since the measuring device 10 measures the positions of the edges with high precision, it is possible to precisely determine, for example, the dimensions and geometrical tolerance of the measurement object 170.

In this way, according to the measuring device 10 of the exemplary embodiment, since information regarding the depth (height) of the measurement object included in the three-dimensional data obtained by the three-dimensional measuring unit is used, the measuring device 10, the influence of surface texture is reduced, so that it is possible to detect the true edges and prevent false detection of the edges. Further, setting the edge detection range in a range that is limited to the vicinity of the true edges including the positions of the true edges allows the positions of the edges of the measurement object to be identified with high precision.

Although, in the exemplary embodiment, the measurement object 170 is illuminated by the incoherent light sources 103, and light reflected or scattered by the measurement object is measured by the image pickup unit 110, the present invention is not limited thereto. For example, it is possible to form the support 106 out of a transparent material, such as a glass plate, illuminate the measurement object 170 from behind (lower side of) the measurement object 170, and to subject a shadow formed by light dimmed or blocked by the measurement object 170 to image pickup by the image pickup unit 110.

The image pickup unit may use an image pickup element, such as a charge-coupled device (CCD), or a line sensor or a photosensor. When a line sensor or a photosensor is used, scanning of the line sensor or the photosensor is performed to obtain an image.

Second Exemplary Embodiment

Figure 4:
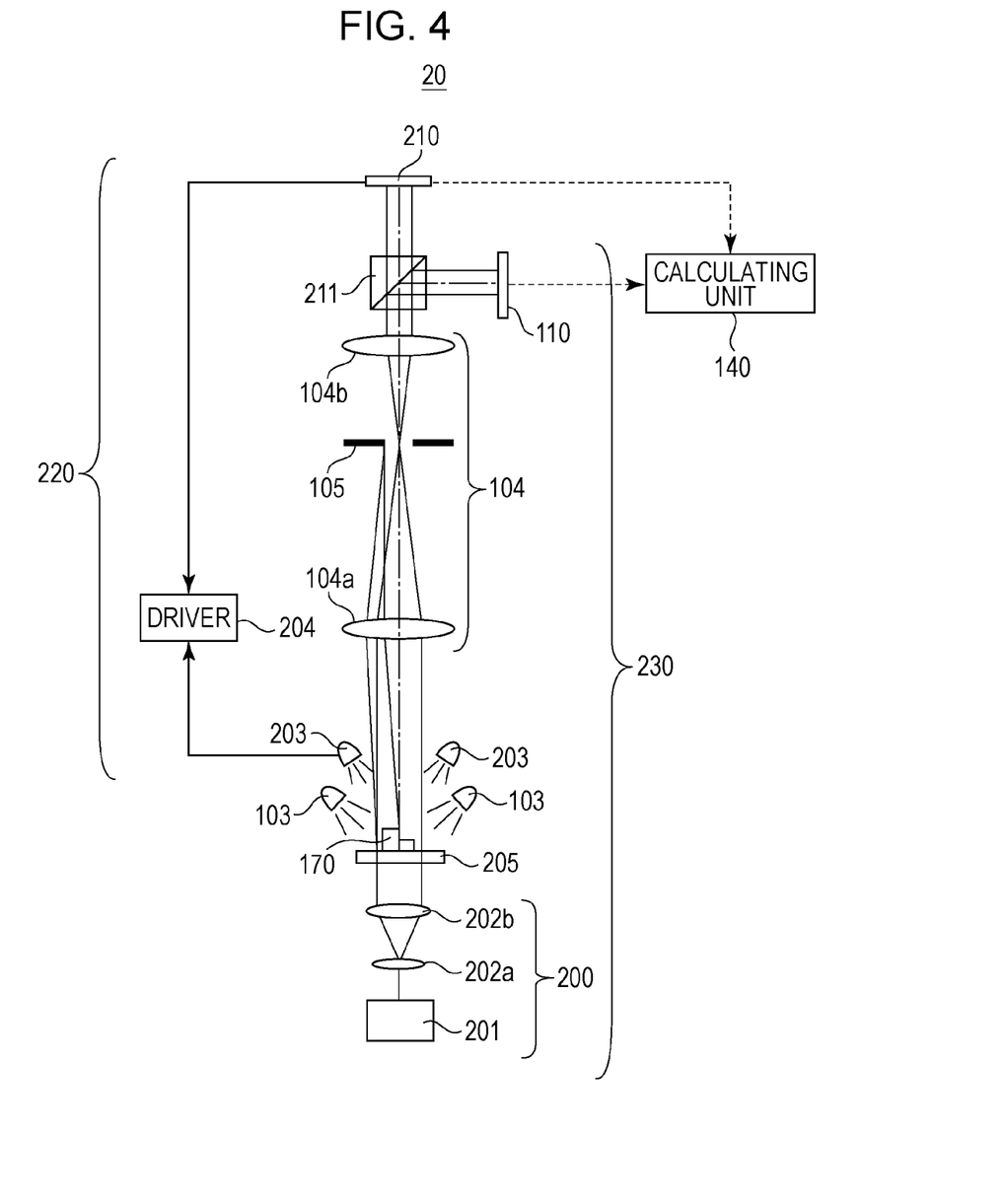
FIG. 4 is a schematic view of a measuring device according to a second exemplary embodiment.

FIG. 4 is a schematic view of a measuring device 20 according to a second exemplary embodiment. Members that correspond to those in the first exemplary embodiment are not described.

A three-dimensional measuring unit 220 of a measuring device 20 includes a time-of-flight (TOF) camera 210 serving as an image pickup unit. The TOF camera is a camera that uses a time-of-flight method for calculating distance by measuring the time of flight of light until light emitted from a light source reaches the camera after the light has reached a measurement object and has been reflected by the measurement object.

A number of methods are provided for the TOF camera. A method in which a pulsed light source, such as a light-emitting diode (LED), illuminates a measurement object, a camera measures the time taken for a light pulse to reach the camera, and the distance is calculated from the time corresponds to the light pulse method. A method in which light intensity is modulated to a sinusoidal shape, a camera measures a change in the phase of light that has reached the camera, and the distance is calculated from the change in the phase corresponds to the phase difference method. Although the three-dimensional measuring unit 220 according to the second exemplary embodiment uses the light pulse method, the method that is used by the TOF camera is not limited thereto.

The three-dimensional measuring unit 220 includes pulsed light sources 203 and a driver 204 that causes the pulsed light sources 203 and a TOF camera 210 to be in synchronism with each other. Each pulsed light source 203 illuminates a measurement object 170 with a light pulse, and light reflected and scattered by the measurement object 170 is converged by an optical system 104. Since the pulsed light sources 203 emit light pulses having a wavelength in a near-infrared region, when a wavelength filter 211 that transmits near-infrared light and that reflects visible light is provided, it is possible to guide only near-infrared light to the TOF camera 210.

The measurement object 170 and the TOF camera 210 are in a conjugate relationship due to the optical system 104. The TOF camera 210 performs image pickup on the light reflected or scattered by the measurement object 170, and calculates the distance from a pulse time difference (time from emission to arrival). The TOF camera 210 outputs to a calculating unit 140 distance data calculated for each position of the measurement object as three-dimensional point group data of the measurement object 170.

Since the TOF camera includes a complicated sensor, there is currently a limit as to how high resolution can be made. Therefore, since the density of the three-dimensional point group data that is obtained by the TOF camera is lower than that of two-dimensional image data that is obtained by a two-dimensional measuring unit, the precision with which positions of edges are detected is not high. Consequently, as described later, the positions of the edges are determined using a two-dimensional image.

In addition to the incoherent light sources 103, the two-dimensional measuring unit 230 of the measuring device 20 includes an illumination unit 200 that illuminates the measurement object 170 from behind (lower side of) the measurement object 170 by transmitting the light therethrough. The illumination unit 200 includes an illumination light source 201 and a beam expander 202 including lenses 202a and 202b. The light source 201 is, for example, a green or red LED. The diameter of a light beam emitted from the light source 201 is increased by the beam expander 202. The light beam whose diameter has been increased is transmitted through a support 205 and illuminates the measurement object 170. The support 205 transmits light therethrough because the support 205 is formed of a transparent material, such as glass or sapphire. When the measurement object 170 is formed of an opaque material, a shadow formed when the measurement object 170 blocks light is formed on an image pickup unit 110 by the optical system 104. Since, in transmissive illumination, an image having a contrast that is higher than that in reflective illumination is obtained, transmissive illumination is particularly suitable for measuring contours of a measurement object.

As in the first exemplary embodiment, the two-dimensional measuring unit 230 also includes the incoherent light sources 103 for achieving reflective illumination. The two-dimensional measuring unit 230 can be used by selecting either one of reflective illumination and transmissive illumination and switching to the selected illumination.

The data of two-dimensional image subjected to image pickup by the image pickup unit 110 of the two-dimensional measuring unit 230 is output to the calculating unit 140. As in the first exemplary embodiment, in accordance with the calculation flowchart in FIG. 2, the calculating unit 140 uses the three-dimensional point group data and the two-dimensional image data to detect the edges of the measurement object and calculate shape information of the measurement object.

The measuring device according to the second exemplary embodiment is capable of detecting edges of a measurement object with high precision.

In the measuring device 20 according to the second exemplary embodiment, the TOF camera 210 and the image pickup unit 110 share a straight line indicated by alternate long and short dashed lines and passing through an optical axis of the optical system 104. Therefore, three-dimensional point group data of side surfaces of the measurement object 170 cannot be obtained.

Third Exemplary Embodiment

Figure 5:
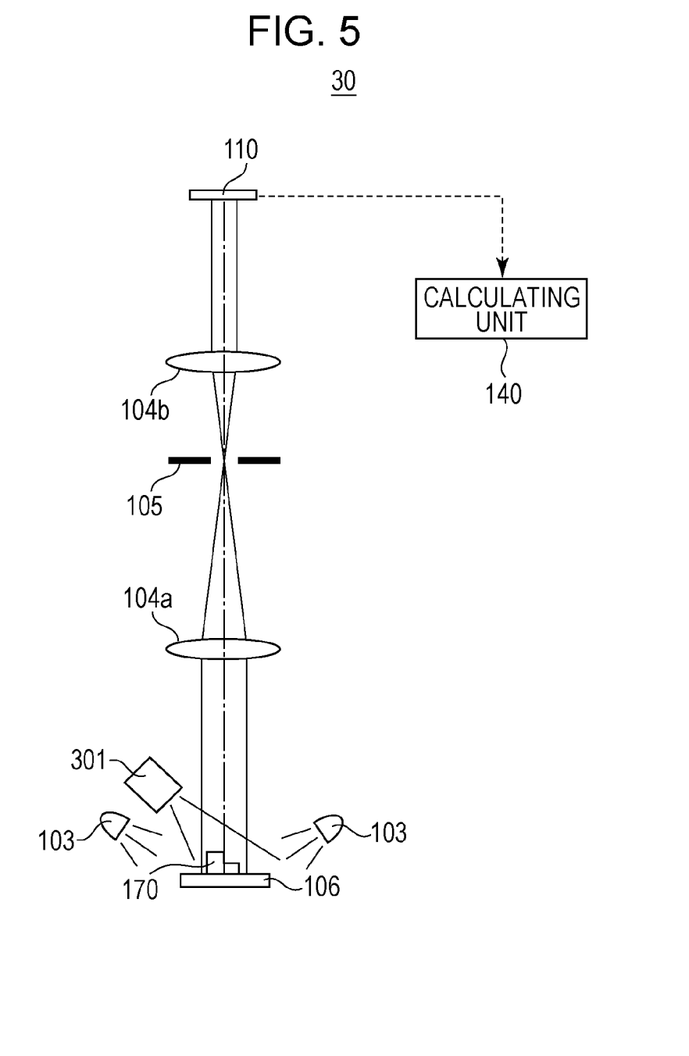
FIG. 5 is a schematic view of a measuring device according to a third exemplary embodiment.

FIG. 5 is a schematic view of a measuring device 30 according to a third exemplary embodiment. Members that correspond to those in the previous exemplary embodiments are not described.

A three-dimensional measuring unit of the measuring device 30 is a measuring unit using a pattern projection method. The measuring unit that uses the pattern projection method includes, for example, a projector that projects a light pattern and a light detector. The principle of the pattern projection method is as follows. That is, a known light pattern is projected onto a measurement object, and distortion of the light pattern generated on the basis of the shape of the measurement object is detected by the light detector, to calculate three-dimensional point group data of the measurement object from the detected data.

There are a number of pattern projection methods. A pattern projection method in which multiple grating patterns are projected onto a measurement object to obtain multiple images, and stripes are analyzed to calculate three-dimensional point group data corresponds to the grating pattern projection method. A pattern projection method in which pattern distortion of one image subjected to image pickup by projecting a known random pattern is analyzed to calculate three-dimensional point group data corresponds to the random pattern projection method. When the grating pattern projection method is used, it is necessary to obtain multiple images. Therefore, in order to perform measurements in a short time, it is necessary to use a camera that is capable of high-speed photography. However, since there is a trade-off relationship between the number of pixels and the frame rate of the camera, if an attempt is made to shorten measurement time, the number of pixels used in performing measurement by an image pickup element must be reduced. In this case, the density of the three-dimensional point group data that is obtained is reduced. When the random pattern projection method is used, since coordinate data of only the positions where the pattern exists can be obtained, only low-density three-dimensional point group data can be obtained. Although the measuring device 30 according to the third exemplary embodiment is based on the principle of the random pattern projection method, the pattern projection method is not limited thereto.

The three-dimensional measuring unit of the measuring device 30 includes a projector 301. The projector 301 projects a known random pattern onto a measurement object 170. The pattern distorted on the basis of the shape of the measurement object 170 is formed on an image pickup unit (light detector) 110 by an optical system 104. Data of an image subjected to image pickup by the image pickup unit 110 is sent to a calculating unit 140. The calculating unit 140 calculates the amount of distortion of the pattern from the obtained image data, and calculates the three-dimensional data of the measurement object 170 using information regarding the known random pattern.

As in the previous exemplary embodiments, the measuring device 30 also includes incoherent light sources 103 for achieving reflective illumination. The incoherent light sources 103 illuminate the measurement object 170. Light reflected or scattered by the measurement object 170 is caused to form an image on the image pickup unit 110 by the optical system 104. Data of a two-dimensional image subjected to image pickup is sent to the calculating unit 140. As in the first exemplary embodiment, in accordance with the calculation flowchart in FIG. 2, the calculating unit 140 uses the three-dimensional point group data and the two-dimensional image data to detect the edges of the measurement object and calculate shape information of the measurement object.

The measuring device according to the third exemplary embodiment is capable of detecting edges of a measurement object with high precision.

When the measuring device 30 according to the third exemplary embodiment is used, since the three-dimensional point group data and the two-dimensional image data are obtained by the same image pickup unit 110, three-dimensional point group data of side surfaces of the measurement object 170 cannot be obtained.

Fourth Exemplary Embodiment

Figure 6:
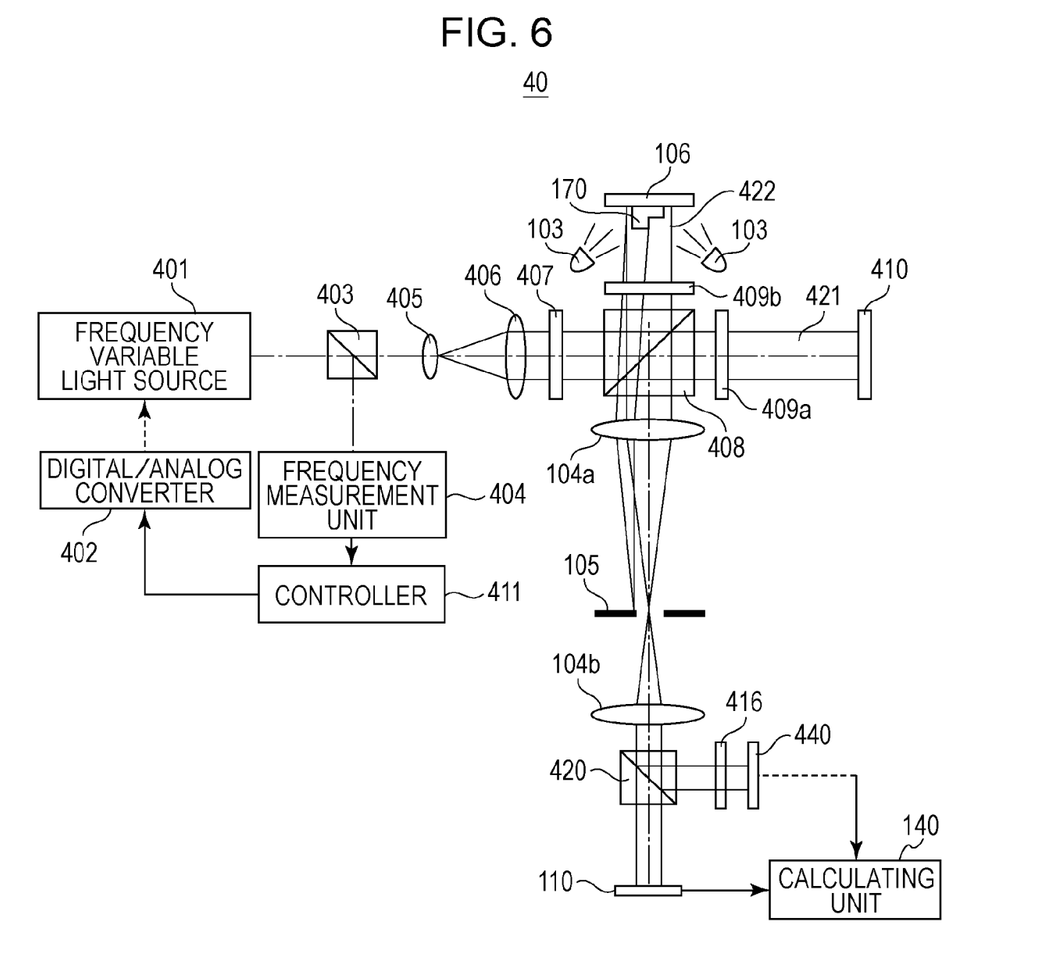
FIG. 6 is a schematic view of a measuring device according to a fourth exemplary embodiment.

FIG. 6 is a schematic view of a measuring device 40 according to a fourth exemplary embodiment. Members that correspond to those in the previous exemplary embodiments are not described.

A three-dimensional measuring unit of the measuring device 40 includes a frequency scanning interferometer. The frequency scanning interferometer includes, for example, a coherent frequency variable light source 401, interference optical systems (405 to 409, 416, 420) for generating interference light, and a light detector 440 that receives the interference light. The principle of the frequency scanning interferometer consists in obtaining a signal of interference light of light to be measured and reference light while performing frequency scanning using light emitted from a light source, and calculating the distance (position of a measurement surface) from a change in phase of the interference signal.

The frequency variable light source 401 is a coherent light source that allows frequency scanning in a certain frequency domain. As the frequency variable light source 401, for example, a full-band tunable DFB laser or a semiconductor laser (ECDL) using an external resonator may be used. The frequency variable light source 401 is connected to a digital/analog converter 402. By adjusting a current value that is sent to the frequency variable light source 401 from the digital/analog converter 402, the frequency of the light that is emitted from the light source is controlled.

Light emitted from the frequency variable light source 401 is guided to a beam splitter 403. A portion of the light that is split by the beam splitter 403 is guided to a frequency measurement unit 404. The frequency measurement unit 404 is capable of measuring the frequency of light that is emitted from the frequency variable light source 401. Data regarding the frequency measured by the frequency measurement unit 404 is sent to a controller (control unit) 411. The controller 411 sends a control signal to the digital/analog converter 402 so that the frequency that is measured becomes a predetermined frequency. If the frequency variable light source 401 can be set to the predetermined frequency with high precision, the frequency measurement unit 404 can be omitted.

The other portion of the light that is split by the beam splitter 403 has its beam diameter increased by the lenses 405 and 406, and is then guided to the λ/2 waveplate 407. The λ/2 waveplate 407 is made rotatable by a rotary mechanism (not shown). Linearly polarized light is emitted from the frequency variable light source 401. On the basis of the rotation angle of the λ/2 waveplate 407, the polarization direction of light that has been transmitted through the λ/2 waveplate 407 can be controlled in any direction. A polarization beam splitter 408 is disposed behind the λ/2 waveplate 407. On the basis of the rotation angle of the λ/2 waveplate 407, it is possible to change a slit ratio of light provided by the polarization beam splitter 408.

Light incident upon the polarization beam splitter 408 is split into reference light 420 and light to be measured 422 whose polarization directions are orthogonal to each other. After the reference light 421 has passed through a λ/4 waveplate 409a, the reference light 421 is guided to a reference mirror 410. After the light to be measured 422 has passed through a λ/4 waveplate 409b, the light to be measured 422 is guided to a measurement object 170. The measurement object 170 is placed on a support 106.

After light reflected or scattered by the measurement object 170 has passed through the λ/4 waveplate 409b again, the light is guided to the polarization beam splitter 408. Similarly, after light reflected by the reference mirror 410 has passed through the λ/4 waveplate 409a again, the light is guided to the polarization beam splitter 408. As a result of passing through the corresponding λ/4 waveplate twice, the polarization direction of the reference light 421 and the polarization direction of the light to be measured 422 are both rotated by 90 degrees. By reflecting the reference light 421 by the polarization beam splitter 408 and by transmitting the light to be measured 422 through the polarization beam splitter 408, the reference light and the light to be measured are both guided towards the optical system 104. This causes the reference light 421 and the light to be measured 422 to be superimposed upon each other.

The lights that are superimposed upon each other again by the beam splitter 408 are converged by a lens 104a. It is desirable that the front focal point of the lens 104a be set close to a surface of the measurement object 170 that is measured. This causes the surface of the measurement object 170 to be focused without being blurred at an image pickup unit (first image pickup element) 110 and the light detector 440.

An iris diaphragm 105 is disposed near the back focal point of the lens 104a. It is possible to adjust the light quantity, depth of field, and the size of the spectrum of interference light on the basis of the magnitude of the aperture diameter of the iris diaphragm 105.

Light that has passed through the iris diaphragm 105 is converged by a lens 104b, is reflected by a wavelength filter 420, and is guided to a polarizer 416. A transmission axis of the polarizer 416 is disposed at an angle of 45 degrees from the polarization direction of the reference light and the polarization direction of the light to be measured. This causes the reference light and the light to be measured to interfere with each other, so that interference light is generated.

The reference light and the light to be measured are reflected by the wavelength filter 420 and are guided to a light detector (second image pickup element) 440. Then, the light intensity (light quantity) of the interference light is measured by the light detector 440. The light detector 440 is, for example, a CCD or a complementary metal-oxide semiconductor (CMOS). An image (interference signal) of interference light that has been measured by the light detector 440 is sent to a calculating unit 140.

When the total frequency scanning amount is ΔF, the light speed is c, and the amount of change in phase of the interference signal is ΔΦ, an optical path length difference between the optical path at the reference mirror 410 and the measurement object 170 is expressed by Formula (1) below:

$$L = \frac{c \cdot \Delta\Phi}{4\pi \cdot \Delta F} \quad (1)$$

The frequency scanning interferometer is capable of determining the optical path length difference by performing frequency scanning using light emitted from a light source, measuring an interference signal, and calculating the amount of change in phase of the interference signal. In the measuring device 40, a plurality of images are obtained at the light detector 440 while performing frequency scanning using the light that is emitted from the frequency variable light source 401. The obtained images are sent to the calculating unit 140, and the calculating unit 140 analyzes the interference signal, so that the optical path length difference is calculated. Since the light detector 440 is an area sensor, it is possible to obtain three-dimensional point group data in directions X, Y, and Z of the measurement object by processing the interference signal for each pixel.

In order to obtain information regarding the optical path length difference, the frequency scanning interferometer needs to obtain a plurality of images. In order to reduce the time taken to obtain the images and to reduce the time required for measurement, it is desirable to use a camera that is capable of high-speed photography. However, since there is a trade-off relationship between the number of pixels and the frame rate of the camera, if an attempt is made to shorten measurement time, an image pickup element having a small number of pixels must be used. In this case, the density of the three-dimensional point group data that is obtained is reduced.

When the surface roughness of the measurement object 170 is high, if the measurement object 170 is illuminated with coherent light, a spectrum is generated. When frequency scanning is performed, phase correlation is reduced at a portion where the light intensity of the spectrum is low. Therefore, measurement error is large. In order to avoid a reduction in the reliability of the measurement, three-dimensional point group data regarding the portion where the light intensity of the spectrum is low is removed from the data, so that the reliability of the measurement is increased. However, in this case, the density of the three-dimensional point group data is reduced in accordance with the threshold of the light intensity of the spectrum.

Accordingly, it is difficult to obtain an image having a high resolution when measurement time is reduced and a spectrum exists. Since the density of the three-dimensional point group data is lower than that of the two-dimensional image data, the precision with which the positions of edges are detected is not high. Therefore, the two-dimensional image data measured by the two-dimensional measuring unit is used to determine the positions of the edges with high precision.

The measuring device 40 also includes incoherent light sources 103. The dimensions in the lateral directions (directions x and y) of the measurement object are calculated using images obtained by illuminating the measurement object with light from the incoherent light sources 103. The incoherent light sources 103 include a plurality of light-source elements. The plurality of light source elements are arranged in the form of a ring. Each light source element is controllable so as to turn on individually. This makes it possible to achieve illumination from a desired direction.

The wavelengths of light emitted from the coherent light sources 103 and the wavelength of light emitted from the frequency variable light source 401 differ from each other. The wavelength filter 420 is designed so as to transmit the light from the incoherent light sources 103 and reflect light from the frequency variable light source 401. Light emitted from the incoherent light sources 103 and reflected or scattered by the measurement object 170 is transmitted through the wavelength filter 420 and forms an image on an image pickup surface of the image pickup unit 110.

Figure 7:
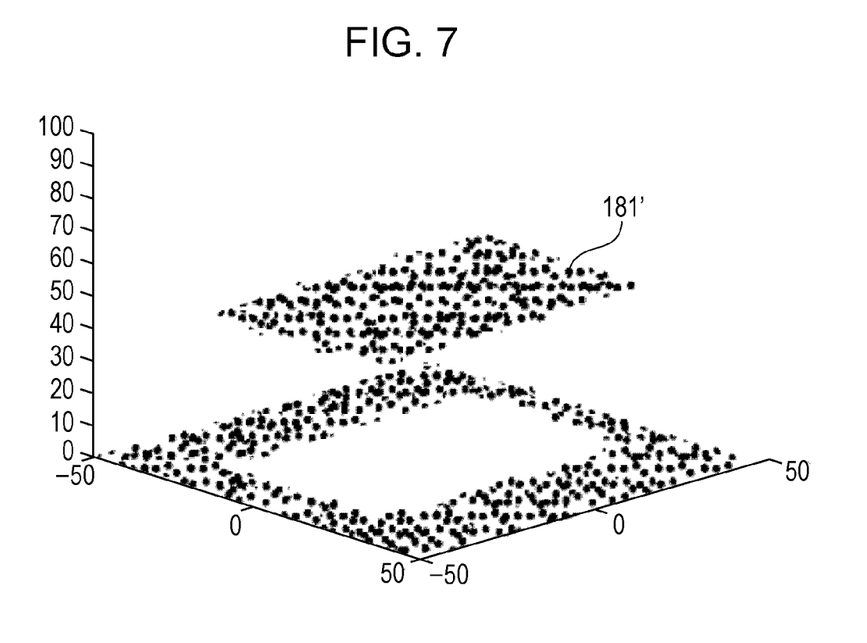
FIG. 7 shows three-dimensional point group data according to the fourth exemplary embodiment.

The first image pickup element 110 performs image pickup on the measurement object 170, and outputs a two-dimensional image of the measurement object 170. The precision with which the dimensions in the lateral directions (directions x and y) of the measurement object are measured depends upon the resolution of the image pickup unit 110. Since it is not necessary to obtain many two-dimensional images for measuring the dimensions in the lateral directions of the measurement object 170, the first image pickup element 110 performs photography at a lower speed than the second image pickup element 440, whereas the resolution of the first image pickup element 110 is higher than that of the second image pickup element 440. Accordingly, the resolution of the three-dimensional point group data obtained by the second image pickup element 440 is set lower than the resolution of the two-dimensional image data in the directions x and y obtained by the first image pickup element 110. This is because, since computation time is long if the resolution of the three-dimensional point group data is high, the resolution of the three-dimensional point group data is made as low as possible to use a two-dimensional image to detect edges with high precision. In order to detect the edges with higher precision than when the edges are detected from three-dimensional point group data, the resolution of two-dimensional image data is higher than that of the three-dimensional point group data in at least an edge detection range. The two-dimensional image data subjected to image pickup by the first image pickup element 110 of the two-dimensional measuring unit is sent to the calculating unit 140. The calculating unit 140 automatically measures with high precision the positions of the edges of the measurement object 170 using the three-dimensional point group data and the two-dimensional image data, and calculates shape information, such as the dimensions, the tolerance, and the angle, of the measurement object 170 from the measured edge positions. The calculation process of the shape information is the same as that in FIG. 2. FIG. 7 shows three-dimensional point group data 181' obtained by measuring the shape of a rectangular parallelepiped measurement object. An item of three-dimensional measurement data at each point of the measurement object is represented by a black dot. In S108, the calculating unit 140 detects the edges from the two-dimensional image data in the set edge detection range 185. In the exemplary embodiment, since the resolution of the two-dimensional image data is higher than that of the three-dimensional point group data, in S108, it is possible to detect the positions of the edges with higher precision than when the edges are detected only from the three-dimensional point group data.

When the measuring device 40 according to the fourth exemplary embodiment is used, since the light detector 440 and the image pickup unit 110 share a straight line that passes through the optical axis of the optical system 104, three-dimensional point group data of side surfaces of the measurement object 170 cannot be obtained.

Fifth Exemplary Embodiment

Figure 8:
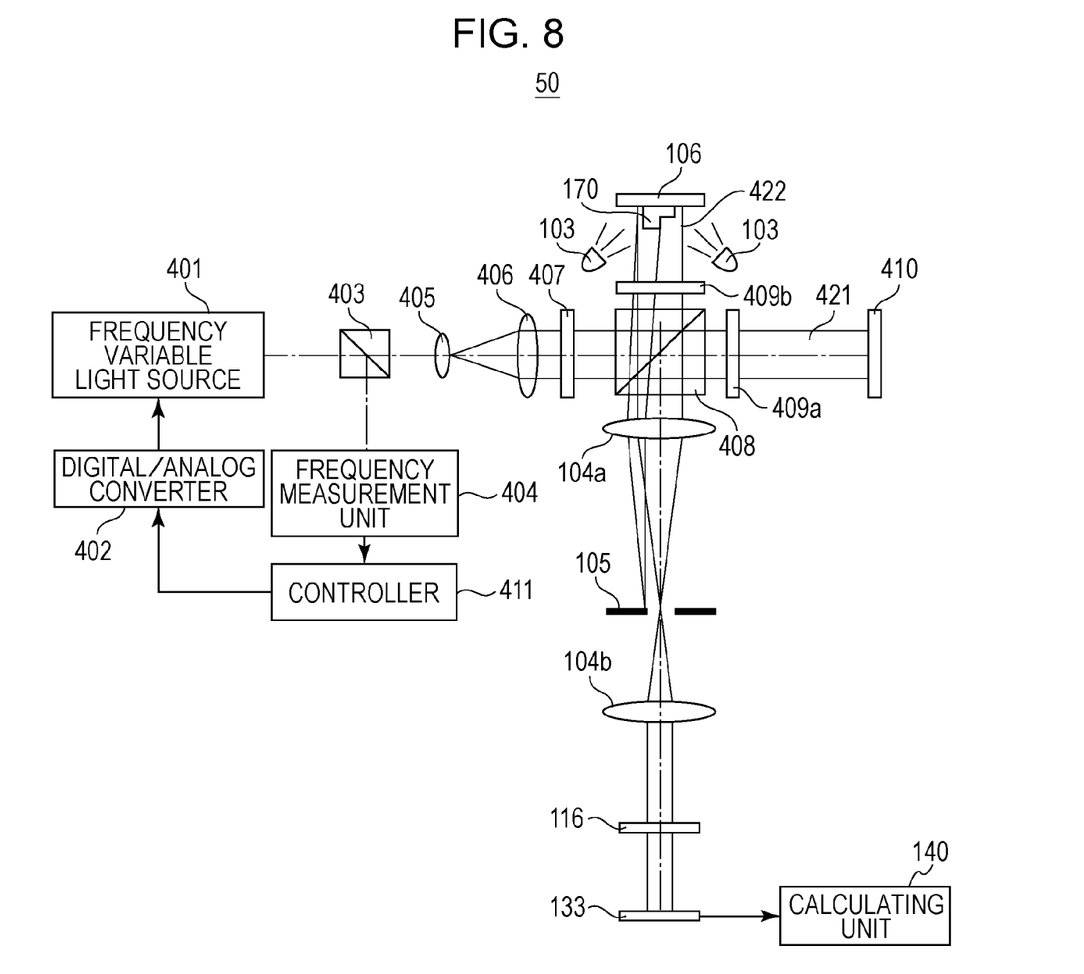
FIG. 8 is a schematic view of a measuring device according to a fifth exemplary embodiment.

FIG. 8 is a schematic view of a measuring device 50 according to a fifth exemplary embodiment. The measuring device 50 according to the fifth exemplary embodiment differs from the measuring device 40 according to the fourth exemplary embodiment in the number of image pickup elements. In the measuring device 50 according to the fifth exemplary embodiment, an interference signal generated by light that is guided from a frequency variable light source 101 and an image of a measurement object 170 generated by light that is guided from incoherent light sources 103 are subjected to image pickup by one common image pickup element 133. The image pickup element 133 is, for example, a CCD or a CMOS. It is possible to obtain images under a plurality of conditions in which resolutions differ.

In the measuring device 50, a three-dimensional measuring unit performs three-dimensional measurement to obtain three-dimensional point group data, and a two-dimensional measuring unit performs image pickup on a measurement object to obtain two-dimensional image data. Using these items of data, edges of the measurement object are automatically detected with high precision. Even in the fifth exemplary embodiment, as in the first exemplary embodiment, the edges can be automatically detected by performing the calculation process shown in FIG. 2.

First, in the measuring device 50, the three-dimensional measuring unit obtains three-dimensional point group data (S101). With the image pickup element 133 being set to a first condition, the three-dimensional point group data is calculated from a plurality of images obtained under the first condition. In a frequency scanning interferometer, in order to calculate the three-dimensional point group data, it is necessary to obtain a plurality of interference signals. In order to measure the three-dimensional point group data of the measurement object in a short time, a image pickup element having a high frame rate is required. Under the first condition of the image pickup element 133, by binning, the resolution used in performing image pickup by the image pickup element is set at a low resolution (first resolution), whereas the images are obtained at a high-speed frame rate. This causes three-dimensional point group data having the first resolution to be obtained by the three-dimensional measuring unit.

S102 and S103 are the same as those in the first exemplary embodiment. Next, the image pickup element 133 is set to a second condition, and a two-dimensional image is measured under the second condition (S104). In order to precisely calculate dimensions in lateral directions, the two-dimensional image needs to have high resolution. Unlike interference signals that require a plurality of images, only one two-dimensional image is required at most. Therefore, even if the frame rate is low, an image pickup element having a high resolution is required. Therefore, in the second condition of the image pickup element 133, without performing binning, images are obtained at a resolution (second resolution) that is used in performing image pickup by the image pickup element and that is higher than the first resolution. This causes the two-dimensional measuring unit to obtain a two-dimensional image data having the second resolution.

The measurement steps S105 to S108 are the same as those in the first exemplary embodiment.

According to the measuring device 50 of the fifth exemplary embodiment, the resolution of the two-dimensional image data is higher than that of the three-dimensional point group data. That is, the number of data points of the two-dimensional image data is larger than that of the three-dimensional point group data. Therefore, it is possible to detect the positions of the edges of the measurement object with high precision. Although the two-dimensional image has high resolution, measurement is performed under the low-speed first condition. In addition, although the resolution of interference signals requiring a plurality of images is low, measurement is performed under the high-speed second condition. Therefore, the measurement time of the three-dimensional point group data is reduced, so that the overall measurement speed is higher than those of existing measurements.

Accordingly, the measuring device according to the exemplary embodiment is capable of automatically detecting the edges of the measurement object with high precision even if the measurement object is chamfered or has surface texture.

Exemplary Embodiment of Method for Producing Item

A method for producing an item according to an exemplary embodiment is used for producing an item, such as an optical element or a metallic part including a gear. The method for producing an item according to the exemplary embodiment includes the step of measuring shape information, such as the dimensions, of a measurement object (serving as the item) using the above-described measuring device and the step of processing the measurement object on the basis of results of the measurement in the measuring step. For example, the shape of the measurement object is measured using the measuring device, and, on the basis of the results of the measurement, the measurement object is processed so that the shape of the measurement object becomes a desired shape (for example, a design value). Since the shape of the measurement object can be measured with high precision using the above-described measuring device, the method for producing an item according to the exemplary embodiment is advantageous compared to existing methods in at least the processing precision of an item.

Although exemplary embodiments according to the present invention have been described above, the present invention is not limited to these exemplary embodiments. Various modifications and changes may be made within the scope of the gist of the present invention.

Although, in the fourth and fifth exemplary embodiments, a frequency scanning interferometer is used as the three-dimensional shape measuring unit, the present invention is not limited thereto. There may be used, for example, other publicly know measuring units, such as a multi-wavelength interferometer that generates a combined wavelength of light beams having a plurality of wavelengths and a white-light interferometer that uses a low coherent light source, such as a white LED, as the light source.

Although, in the fourth and fifth exemplary embodiments, the measurement object 170 is illuminated by the incoherent light sources 103 and light reflected or scattered by the measurement object 170 is measured by the image pickup element, the present invention is not limited to such a structure. For example, it is possible to form the support 106 out of a transparent material, such as a glass plate, illuminate the measurement object 170 from behind the measurement object 170 (a side opposite to the measurement object), and to subject a shadow formed by light dimmed or blocked by the measurement object 170 to image pickup by the image pickup unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120158, filed Jun. 6, 2013, and Japanese Patent Application No. 2013-120159, filed Jun. 6, 2013, which are hereby incorporated by reference herein in their entirety.

What is claimed is:

1. A measuring device that measures a measurement object, the measuring device comprising:
   a two-dimensional measuring unit that obtains two-dimensional image data by performing image pickup on the measurement object;
   a three-dimensional measuring unit that obtains three-dimensional data by three-dimensionally measuring the measurement object; and
   an obtaining unit that detects a temporary edge of the measurement object using the three-dimensional data, sets an edge detection range in a two-dimensional image using the detected temporary edge, and detects an edge of the measurement object in the edge detection range using the two-dimensional image data to obtain shape information of the measurement object.

2. The measuring device according to claim 1, wherein the three-dimensional measuring unit includes an interferometer that causes reference light and light to be measured coming from the measurement object to interfere with each other.

3. The measuring device according to claim 1, wherein the three-dimensional measuring unit measures the measurement object by using an optical cutting method in which the measurement object is linearly illuminated and distortion of an illumination line generated by the measurement object is measured.

4. The measuring device according to claim 1, wherein the three-dimensional measuring unit measures the measurement object by using a time-of-flight method in which a time until light emitted from a light source reaches a light detector after the light has reached the measurement object and has been reflected by the measurement object is measured.

5. The measuring device according to claim 1, wherein the three-dimensional measuring unit measures the measurement object by using a pattern projection method in which a light pattern is projected onto the measurement object, and distortion of the light pattern generated by the measurement object is measured.

6. The measuring device according to claim 2, wherein the interferometer is a frequency scanning interferometer, a multi-wavelength interferometer, or a white-light interferometer.

7. The measuring device according to claim 1, wherein the obtaining unit sets the edge detection range in the two-dimensional image by superimposing the temporary edge of the measurement object on the two-dimensional image after aligning a position of the two-dimensional image data and a position of the three-dimensional data.

8. The measuring device according to claim 7, wherein the obtaining unit aligns the position of the two-dimensional image data and the position of the three-dimensional data on the basis of a previously obtained correspondence between the two-dimensional image data and the three-dimensional data.

9. The measuring device according to claim 1, wherein the obtaining unit sets the edge detection range in the two-dimensional image so as to surround the temporary edge.

10. The measuring device according to claim 1, further comprising a focus adjusting unit that adjusts a focus position in performing measurement by the two-dimensional measuring unit,
    wherein the focus adjusting unit adjusts the focus position using a focus position calculated using the three-dimensional data.

11. The measuring device according to claim 1, wherein the shape information of the measurement object corresponds to a dimension of the measurement object.

12. The measuring device according to claim 1, wherein a resolution of the two-dimensional image data is higher than a resolution of the three-dimensional data.

13. The measuring device according to claim 12, wherein the two-dimensional measuring unit includes a first image pickup element that performs image pickup on the measurement object,
    wherein the three-dimensional measuring unit includes a second image pickup element for three dimensionally measuring the measurement object, and
    wherein a resolution of the first image pickup element is higher than a resolution of the second image pickup element.

14. The measuring device according to claim 12, further comprising an image pickup element that detects light from the measurement object,
    wherein a resolution that is used in performing image pickup by the image pickup element is set to a first resolution and the three-dimensional measurement is performed, so that the third dimensional data having the first resolution is obtained, and wherein the resolution that is used in performing the image pickup by the image pickup element is set to a second resolution and the measurement object is subjected to the image pickup, so that the two-dimensional image data having the second resolution is obtained, the second resolution being higher than the first resolution.

15. A method for producing an item, the method comprising steps of:

measuring shape information of the item using the measuring device according to claim 1; and processing the item on the basis of a result of the measurement in the step of measuring the shape information.

16. A calculating device that calculates shape information of a measurement object, the calculating device comprising:

an obtaining section that obtains two-dimensional image data of the measurement object and three-dimensional data of the measurement object; and a calculating unit that calculates the shape information of the measurement object by detecting a temporary edge of the measurement object using the three-dimensional data, setting an edge detection range in a two-dimensional image using the detected temporary edge, and detecting an edge of the measurement object in the edge detection range using the two-dimensional image data.

17. The calculating device according to claim 16, wherein a resolution of the two-dimensional image data is higher than a resolution of the three-dimensional data.

18. A measurement method for measuring a measurement object, the method comprising steps of:

obtaining two-dimensional image data by performing image pickup on the measurement object;

obtaining three-dimensional data by three-dimensionally measuring the measurement object;

setting an edge detection range in a two-dimensional image using a temporary edge of the measurement object that has been detected using the three-dimensional data; and obtaining shape information of the measurement object by detecting an edge of the measurement object in the edge detection range using the two-dimensional image data.

\* \* \* \* \*